US009870674B2

(12) United States Patent

Hayon

(10) Patent No.: US 9,870,674 B2

(45) Date of Patent: Jan. 16, 2018

(54) SYSTEM AND METHOD FOR PROVIDING A WAGERING GAME DURING A LIVE SPORTING EVENT

(71) Applicant: Tal Hayon, Omer (IL)

(72) Inventor: Tal Hayon, Omer (IL)

( * ) Notice: Subject to any disclaimer, the term of this patent is extended or adjusted under 35 U.S.C. 154(b) by 39 days.

(21) Appl. No.: 14/764,852

(22) PCT Filed: Jan. 30, 2014

(86) PCT No.: PCT/IL2014/050104

§ 371 (c)(1),
(2) Date: Jul. 30, 2015

(87) PCT Pub. No.: WO2014/118777

PCT Pub. Date: Aug. 7, 2014

(65) Prior Publication Data

US 2015/0379816 A1 Dec. 31, 2015

(30) Foreign Application Priority Data

Jan. 31, 2013 (IL) ........................................ 224538

(51) Int. Cl.
*G06F 17/00* (2006.01)
*G07F 17/32* (2006.01)

(52) U.S. Cl.
CPC .......... *G07F 17/3244* (2013.01); *G07F 17/32* (2013.01); *G07F 17/3288* (2013.01)

(58) Field of Classification Search
USPC ...................................................... 463/16–25
See application file for complete search history.

(56) References Cited

U.S. PATENT DOCUMENTS 7,566,258 B2 * 7/2009 Connolly ............... A63H 3/006 446/485
8,246,432 B2 * 8/2012 Lutnick ..................... A63F 1/04 463/6
9,230,403 B2 * 1/2016 O'Brien ................. G06Q 50/34
9,483,908 B2 * 11/2016 Shore .................. G07F 17/3241
(Continued)

OTHER PUBLICATIONS

Patent Cooperation Treaty, International Search Report, International Patent Application No. PCT/IL2014/050104, May 14, 2014, 3 Pages.
(Continued)

*Primary Examiner* — Ronald Laneau
(74) *Attorney, Agent, or Firm* — Fenwick & West LLP

(57) ABSTRACT

The present invention relates to a method for providing a computer based wagering game during a live sporting event, the wagering game based on events occurring during said live sporting event, a principal objective of the game being to acquire the largest number of wins by the end of the sporting event, comprising: a) generating a plurality of betting events by a game administrator at a game server, wherein each of said betting event based on a bettable event occurring during said sporting event; b) allowing one or more players to participant in said wagering game and to selectively bet on possible outcomes of said betting event; c) closing said betting event after a selected interval such that no further bets can be added to said betting event; d) terminating said betting event; and e) upon termination of said betting event, crediting winners of each of said betting event.

10 Claims, 3 Drawing Sheets

(56) References Cited

U.S. PATENT DOCUMENTS

| | | | |
|---|---|---|---|
| 2005/0227757 | A1 | 10/2005 | Simon |
| 2012/0214575 | A1 | 8/2012 | Amaitis et al. |

OTHER PUBLICATIONS

Patent Cooperation Treaty, Written Opinion of the International Searching Authority, International Patent Application No. PCT/IL2014/050104, May 14, 2014, 5 Pages.

* cited by examiner

SYSTEM AND METHOD FOR PROVIDING A WAGERING GAME DURING A LIVE SPORTING EVENT

FIELD OF THE INVENTION

The present invention relates to the field of gaming network platform. More particularly, the invention relates to a method and system for providing a wagering game/contest between users during a live sporting event.

BACKGROUND OF THE INVENTION

Sports contests are typically based on real-life team athletic competitions (e.g., football, baseball, basketball, hockey, soccer, rugby, etc.), real-life athletic competitions in which individuals compete (e.g., golf, tennis, automotive racing, etc.), and real-life sporting events involving animals (e.g., horse and dog racing).

Users may find it desirable to wager with one another based on real-life sporting events, for example, which of the sports contestants will win, what will the score at certain points in the game, etc. In particular, users may find it desirable to wager (e.g., with other users, through a wagering service) based on the outcomes of these real-life sporting events.

Therefore, a need remains for systems and methods that may efficiently generate substantially real-time wagering game or contest between users who are watching the same live sporting event, either while being presence in the event or while watching a broadcast of the same event on user's equipment (e.g., TV, smart-phone and the like). The sporting event can be an athletic competition.

It is an object of the present invention to provide a system which is capable of efficiently generating substantially real-time wagering game or contest between users who are watching the same live sporting event.

Other objects and advantages of the invention will become apparent as the description proceeds.

SUMMARY OF THE INVENTION

The present invention relates to a method for providing a computer based wagering game during a live sporting event, the wagering game based on events occurring during said live sporting event, a principal objective of the game being to acquire the largest number of wins by the end of the sporting event, comprising:

a. generating a plurality of betting events by a game administrator at a game server, wherein each of said betting event based on a bettable event occurring during said sporting event;
b. allowing one or more players to participant in said wagering game and to selectively bet on possible outcomes of said betting event;
c. closing said betting event after a selected interval such that no further bets can be added to said betting event;
d. terminating said betting event; and
e. upon termination of said betting event, crediting winners of each of said betting event.

According to an embodiment of the invention, each of the one or more players is participant in the wagering game via an interactive media guidance application adapted to run on a terminal device and to further communicate with the game server. The terminal device is selected from the group consisting of: set-top-box, smart TV, personal computer, computer based mobile device, or any other equipment provided with the guidance application and is capable of communicating with the other terminal devices and/or the game server.

According to an embodiment of the invention, the game administrator is a human operator.

According to another embodiment of the invention, the game administrator is a virtual operator that automatically generates the betting events during the live sporting event.

According to an embodiment of the invention, the wagering game can be implemented in a casino oriented environment, where the one or more players are physically located in the same place (e.g., the same room).

According to an embodiment of the invention, the interactive media guidance application is provided with a user interface that includes the following elements: a live broadcast of a sporting event, a visual representation of the game administrator, ranking table of the participant players, and a duration indicator of the current betting event. The user interface may further comprise representation of betting suggestion provided by the participant users. The user interface may further comprise live chat for allowing the interaction between the participant players.

In another aspect, the present invention relates to a system of providing a wagering game during a live sporting event, comprising:

a. at least one processor in a game server; and
b. a memory comprising computer-readable instructions which when executed by the at least one processor causes the processor to execute a game administrator, wherein the game administrator:
   - generates a plurality of betting events, wherein each of said betting event based on a bettable event occurring during said sporting event;
   - provides a user interface that allows one or more players to participant in said wagering game and to selectively bet on possible outcomes of said betting event;
   - closes said betting event after a selected interval such that no further bets can be added to said betting event;
   - terminates said betting event; and
   - upon termination of said betting event, credits winners of each of said betting event;

In another aspect, the present invention relates to a non-transitory computer-readable medium that comprises instructions which when executed by at least one processor causes the processor to perform the method of providing a wagering game during a live sporting event as described hereinabove.

DETAILED DESCRIPTION OF THE INVENTION

Figure 1:
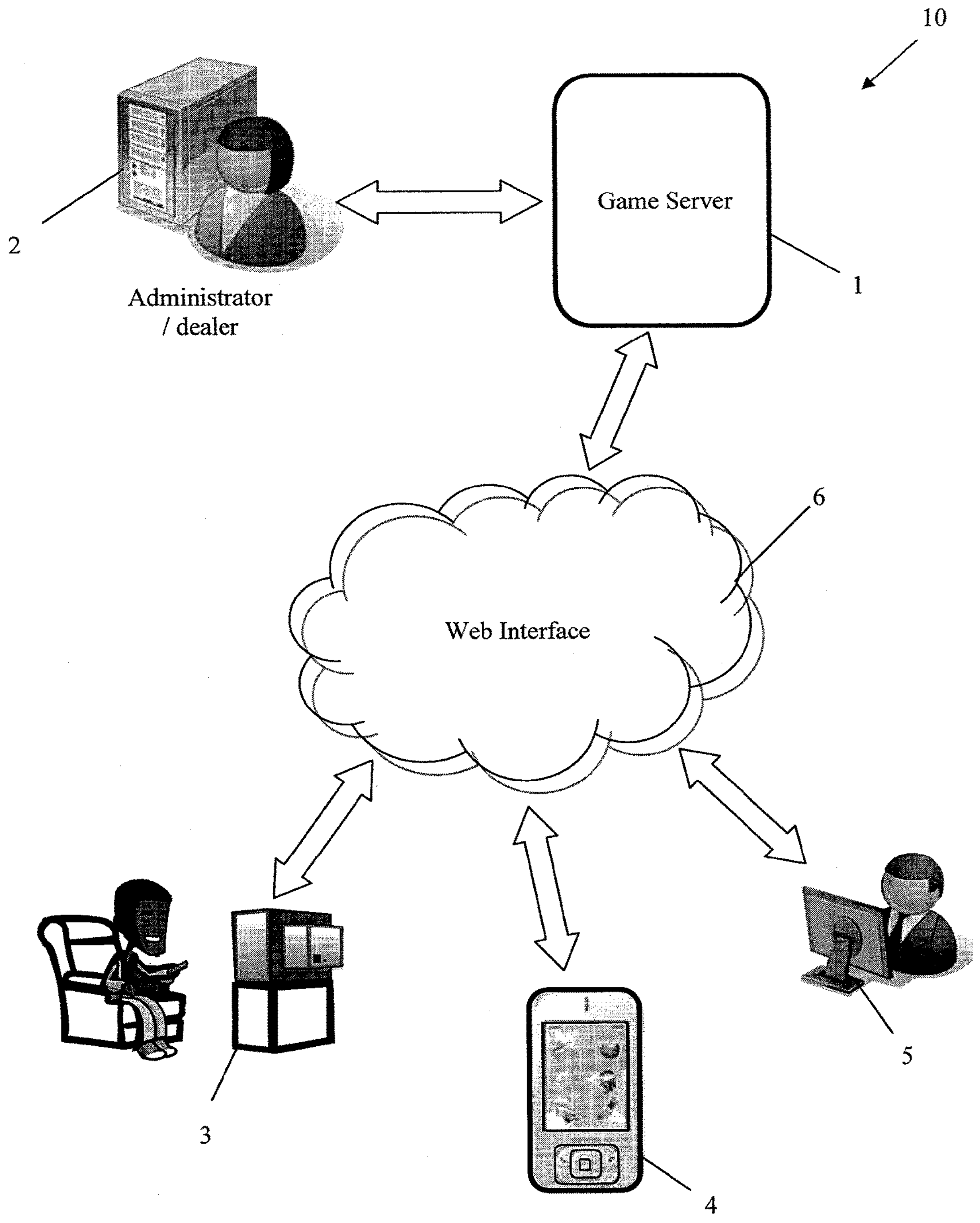
FIG. 1 is a flow chart generally illustrating an embodiment of the invention.

Throughout this description the term "sporting event" is used to indicate a single game or match. However, it will be appreciated that virtually any real-time event that has a series of repeating events with random outcomes can be considered a "sporting event."

In the following detailed description, references are made to the accompanying drawings that form a part hereof, and in which are shown by way of illustrations specific embodiments or examples. Wherever practicable similar or like reference numbers may be used in the figures and may indicate similar or like functionality. These embodiments may be combined, other embodiments may be utilized, and structural changes may be made without departing from the spirit or scope of the present invention. The following detailed description is therefore not to be taken in a limiting sense and the scope of the present invention is defined by the appended claims and their equivalents. One skilled in the art will readily recognize from the following description that alternative embodiments of the systems and methods illustrated herein may be employed without departing from the principles of the invention described herein.

Although certain examples in this disclosure are illustrated in the context of a user wagering on live sporting event (e.g., an athletic competition) that are currently being broadcast to some of the users, it will be appreciated that many concepts of the invention may be applied to wagers on competitions or programs that are not currently being watched by the user, as well as wagers on events that are not being broadcast at all.

The amount of media (e.g., broadcasts of sporting events) available to users in any given media delivery system can be substantial. Consequently, many users desire a form of media guidance through an interface that allows users to efficiently navigate media selections and easily identify media that they may desire. An application which provides such guidance is referred to herein as an interactive media guidance application or, sometimes, a media guidance application or a guidance application. Generally, the guidance application is a type of program module(s) that includes routines, programs, components, data structures, and other types of structures that perform particular tasks or implement particular abstract data types.

The wagering game suggested by the present invention is described that can be played by a plurality of participant users over wide area network (e.g., the Internet) via any applicable platforms such as set-top boxes, smart-phones, personal computers, tablets, and the like. The wagering game involves a series of opportunities to wager on events associated with a live or determinate sporting event, such as a soccer, basketball or football game. The users will typically watch or listen to a live broadcast of the game, but the game may also be played in the sporting arena where the sporting event is taking place. Optionally, the wagering game can also be applied to longer term events, such as the standings in a sports league, the outcome of a tournament, or the outcome of a multi-game series. Additionally, there are numerous situations in which the wagering game could be applied to other events that would not typically be considered "sporting events," such as the returns from an election, the outcome of a court proceeding, or the gains and losses on a stock market.

Thus, although the present invention will generally be described and claimed in the context of sporting events, the term "sporting event" should be given the broadest possible interpretation consistent with the present disclosure and the prior art. In the foregoing examples, the outcomes of each wagering event within the sporting event are unknown. Because the outcomes are unknown, these types of sporting events can be referred to more specifically as "indeterminate sporting events".

The following discussion is intended to provide a brief, general description of a suitable computing environment in which the invention may be implemented. While the invention will be described in the general context of program modules that execute in conjunction with an interactive media guidance application that runs on an operating system on a set-top box (STB) or computer based mobile device (e.g., a smart-phone), those skilled in the art will recognize that the invention may also be implemented in combination with other program modules and computer based devices.

Moreover, those skilled in the art will appreciate that the invention may be practiced with other computer system configurations, including hand-held devices, multiprocessor systems, microprocessor-based or programmable consumer electronics, minicomputers, mainframe computers, and the like. According to an embodiment of the invention, the invention is practiced in distributed computing environments where tasks are performed by remote processing devices that are linked through a communications network. In such distributed computing environment, program modules may be located in both local and remote memory storage devices. While certain examples refer to a Set-Top Box (STB) equipment, other computer or electronic systems can be used as well, such as, without limitation, a smart TV, a Personal Computer (PC), tablet, an interactive television, a network-enabled personal digital assistant (PDA), a network game console, a networked entertainment device, a smart phone (e.g., with an operating system and on which a user can install applications), Google Glasses or other computer based vision or display equipment, and so on.

Embodiments of the invention may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

FIG. 1 schematically illustrates a system for providing a wagering game during a live sporting event, according to an embodiment of the present invention. The system generally indicated by numeral 10 in the figure comprises a game server 1, a game administrator 2, and a plurality of users' terminal devices, such as STB 3, smart-phone 4 and PC 5 which are communicated with the game server 1 via a web interface 6 (e.g., the Internet).

According to one aspect, the present invention relates to an online game platform in which players compete with other players in the same pool or different pools, via the online game server 1 administered by the game administrator 2 to predict outcomes of specific conditions relating to activities at various contemporaneous events.

According to an embodiment of the present invention, each specific condition refers to a betting event that is generated during the live sporting event. In contradiction to prior-art wagering methods that the betting are known in advance, the betting events of the present invention are generated during the live sporting event and are not known in advance.

According to another aspect, the system receives live digitized information feed from a sporting event (while the event is currently in-progress) from one or more sources (e.g., external live news, relevant RSS feeds, game administrator, etc.). Additionally, the system may also store historical information relating to a sporting event, or generally, accesses historical information relating to an event from third party sources. It will be understood that such live-feed and historical information are presented to players (participants) as analytics for their guidance in predicting the outcomes of specific conditions relating to the activities at the event.

Yet, in another aspect, the live-feed and historical information are also utilized by the system to extract analytics in generating betting event and predicting outcomes of specific conditions relating to activities at sporting events. In one exemplary embodiment, pre-defined rules are used in conjunction with the analytics to formulate automated system-generated betting event which are presented to players. A player who is able to predict the outcome of the betting event, scores (i.e., win). Consequently, as the sporting event progresses in real-time, more betting events are presented to participants by the system, responses (predicted outcomes) of the participants are received by the system, scored in near real-time based on analytics extracted from game administrator or from other live digitized information feed of the sporting event, and finally the players are ranked by the system. For example, in a soccer match between team "A" to team "B", a betting event can be automatically generated and presented to the participants in form of a question that asks them whether team "A" will score a goal in the next 3 minutes. The betting event can be influenced by live feeds from an external source that reports that a player from team "B" received a "red card" and got out of the game (which means that team "B" plays from now own with fewer players than team "A"). The "red card" can be a trigger (i.e., a rule) for generating such a betting event.

As will be appreciated by the skilled person the arrangement described in the figure results in an online and live gaming platform in which participants compete to determine who best predicts the outcomes of the betting event (i.e., conditions relating to activities occurred during live sporting events). System users can access a User Interface (UI) over a computer network, such as the World Wide Web (WWW), using varying types of electronic devices such as STB (e.g., using a remote control), mobile devices and computers. Accordingly, it will be understood from the foregoing description that various embodiments of the present system described herein are generally implemented as a special purpose or general-purpose computer including various computer hardware as described hereinabove.

All the above will be better understood through the following illustrative and non-limitative examples.

Figure 2:
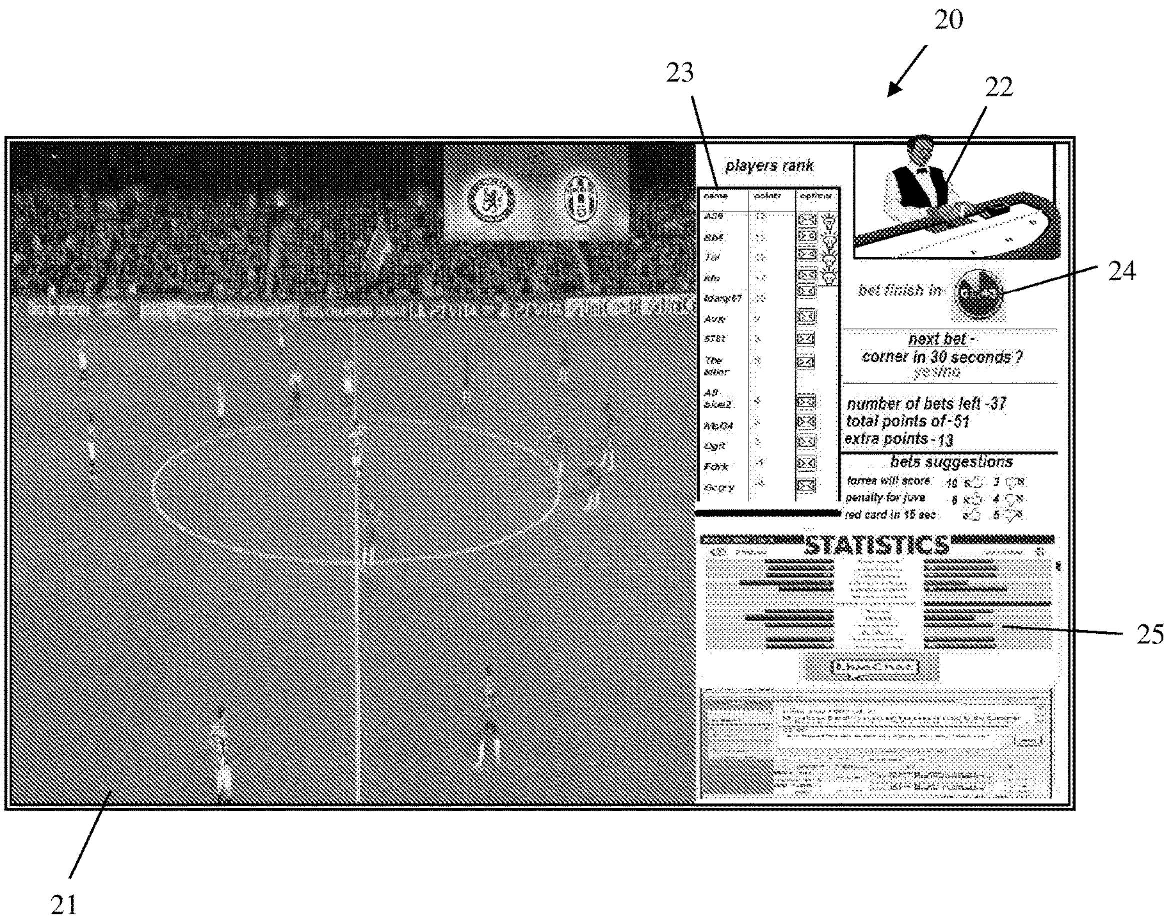
FIG. 2 schematically illustrates an exemplary user interface that can be implemented at set-top boxes, according to one embodiment of the present invention.

FIG. 2 schematically illustrates an exemplary User Interface (UI) 20 that can be implemented in set-top boxes, according to one embodiment of the present invention. The UI 20 may include the following elements: a live broadcast of a sporting event 21, a visual representation 22 of the game administrator, players ranking table 23, a duration indicator 24 of the current betting event (e.g., interval of 2 minutes), statistics, betting suggestion provided by the participant users, live chat and so on.

Figure 3:
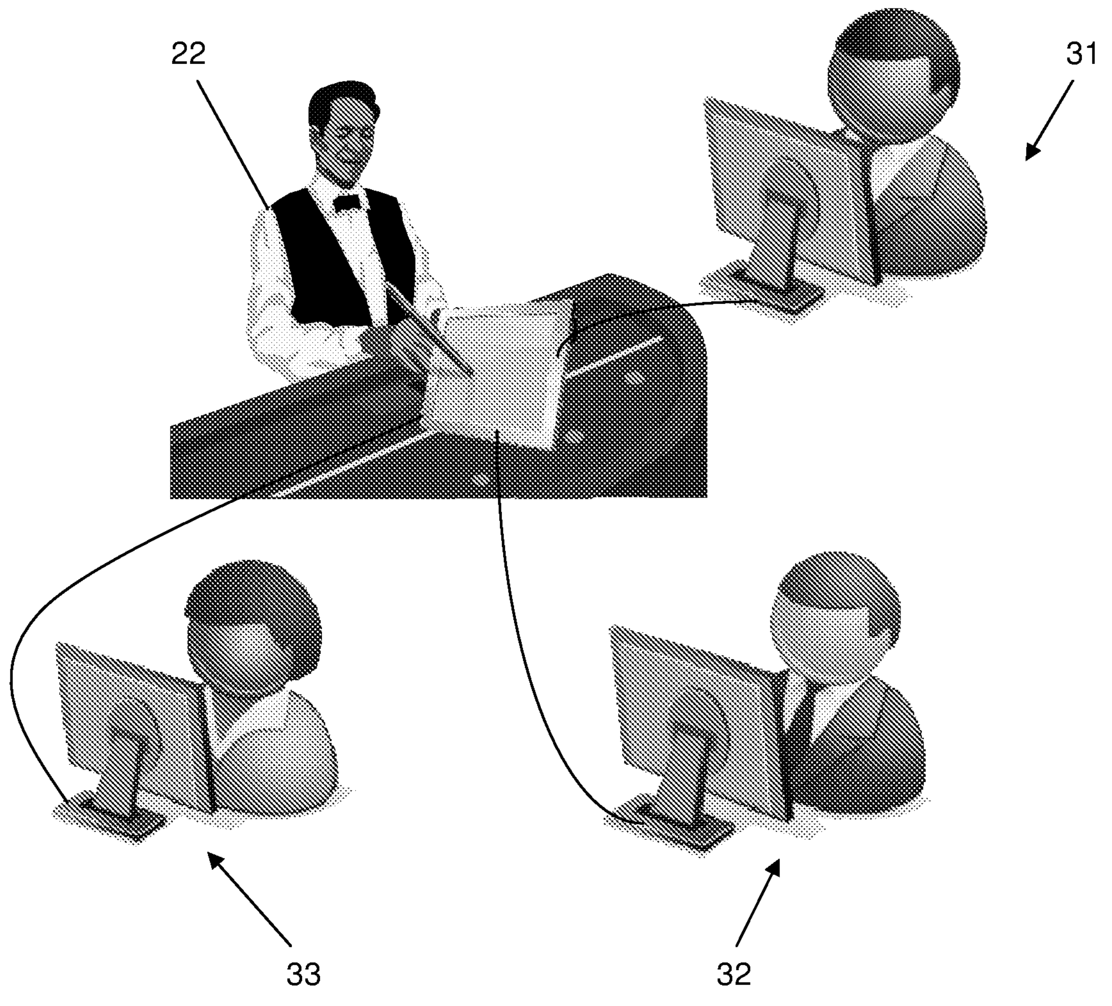
FIG. 3 schematically illustrates an implementation of the system in a casino oriented environment, according to an embodiment of the present invention.

According to one embodiment of the present invention, the game administrator is a human operator. The human operator feeds the system with betting events generated during the live sporting event via a dedicated interface (herein: a dealer interface). The human operator can manage the dealer interface from any suitable computer system. According to some embodiments of the invention, the human operator and one or more participant users may be located in the same room (e.g., playing around the same table like in a casino oriented environment as shown in FIG. 3), where each participant user 31-33 is provided with its own terminal device (e.g., tablet, PC, or any other equipment provided with the guidance application and is capable of communicating with the other terminal devices and/or the computer system of the dealer 22).

According to another embodiment of the present invention, the game administrator is a virtual operator, this might be depend on the nature of the sporting event, wherein betting events are generated during to the live sporting event and can be provided to the participant users in real-time during the sporting event. The game administrator can play with a single participant user and/or with a plurality of users. Optionally, set of betable events can be predefined prior to the live sporting event and can be provided to the users during the sporting event.

All the above description and examples have been given for the purpose of illustration and are not intended to limit the invention in any way. Many different mechanisms, methods of analysis, electronic and logical elements can be employed, all without exceeding the scope of the invention.

The invention claimed is:

1. A method for providing a computer wagering game based on events that occur during a live sporting event, comprising:

a. receiving live feeds about a sporting event, while said event is currently in-progress, from one or more sources and from stored historical information relating to said sporting event;

b. generating in real-time a plurality of betting events by a game administrator at a game server either automatically or via a dealer interface, wherein the game administrator is a human operator or a virtual operator, wherein each of said betting event is based on a bettable event occurring during said live sporting event as received from said live feeds, said live feeds and historical information being used to extract analytics in generating betting event and predicting outcomes of specific conditions relating to activities at said sporting events;

c. allowing one or more players to participate in said wagering game and to selectively bet on possible outcomes of said betting event;

d. closing said betting event after a selected interval such that no further bets can be added to said betting event;

e. terminating said betting event; and f. upon termination of said betting event, crediting winners of each of said betting event, wherein each of the one or more players is participant in the wagering game via an interactive media guidance application adapted to run on a terminal device and to further communicate with the game server, wherein the interactive media guidance application is provided with a user interface that includes the following elements: a live broadcast of a sporting event, a visual representation of the game administrator, ranking table of the participant players, a duration indicator of the current betting event.

2. A method according to claim 1, wherein the terminal device is selected from the group consisting of: set-top-box, smart TV, personal computer, computer based mobile device, or any other equipment provided with the guidance application and is capable of communicating with the other terminal devices and/or the game server.

3. A method according to claim 1, wherein the wagering game is playable in a casino oriented environment.

4. A method according to claim 1, wherein the user interface further comprises representation of betting suggestion provided by the participant users.

5. A method according to claim 1, wherein the user interface further comprises live chat for allowing the interaction between the participant players.

6. A method according to claim 1, wherein the user interface further comprises statistics.

7. A method according to claim 1, further comprising accessing historical information relating to the sporting event from third party sources.

8. A method according to claim 1, further comprising extracting analytics in generating betting event from the live-feed and/or the historical information, by using predefined rules in conjunction with the analytics to formulate automated system-generated betting event.

9. A system of providing a computer based wagering game during a live sporting event, comprising:

a. at least one processor in a game server;

b. a memory comprising computer-readable instructions which when executed by the at least one processor causes the processor to execute a game administrator, wherein the game administrator is a human operator or a virtual operator and:

receives live feeds about a sporting event, while said event is currently in progress, from one or more sources and receives historical information relating to said sporting event;

generates a plurality of betting events, wherein each of said betting event is based on a bettable event occurring during said sporting event as received from said live feeds, said live feeds and historical information being used to extract analytics in generating betting event and predicting outcomers of specific conditions relating to activities at said sporting events;

provides a user interface that allows one or more players to participate in said wagering game and to selectively bet on possible outcomes of said betting event;

closes said betting event after a selected interval such that no further bets can be added to said betting event;

terminates said betting event; and upon termination of said betting event, credits winners of each of said betting event;

c. a plurality of terminal devices communicating with said game server; and d. an interactive media guidance application adapted to run on said terminal devices and to further communicate with the game server, wherein the interactive media guidance application is provided with a user interface that includes the following elements: a live broadcast of a sporting event, a visual representation of the game administrator, ranking table of the participant players, a duration indicator of the current betting event.

10. A non-transitory computer-readable medium comprising instructions which when executed by at least one processor causes the processor to perform the method of claim 1.

* * * * *